United States Patent

Jangbarwala et al.

[11] Patent Number: 5,951,874
[45] Date of Patent: *Sep. 14, 1999

[54] METHOD FOR MINIMIZING WASTEWATER DISCHARGE

[75] Inventors: Juzer Jangbarwala, Chino Hill; Charles F. Michaud, Fullerton, both of Calif.

[73] Assignee: Hydromatix, Inc., Santa Fe Spring, Calif.

[*] Notice: This patent is subject to a terminal disclaimer.

[21] Appl. No.: 08/900,524

[22] Filed: Jul. 25, 1997

[51] Int. Cl.⁶ .................................................. B01J 49/00
[52] U.S. Cl. .......................... 210/662; 210/677; 210/678; 210/685; 521/26
[58] Field of Search .................... 210/662, 670, 210/677, 678, 685, 126, 140; 521/26

[56] References Cited

U.S. PATENT DOCUMENTS

| | | | |
|---|---|---|---|
| 2,754,261 | 7/1956 | Akeroyd | 210/677 |
| 2,938,868 | 5/1960 | Carlson et al. | 210/662 |
| 3,455,819 | 7/1969 | Crits | 210/274 |
| 3,531,401 | 9/1970 | Crits | 210/677 |
| 3,985,648 | 10/1976 | Casolo | 210/669 |
| 4,176,056 | 11/1979 | Grier | 210/670 |
| 4,197,195 | 4/1980 | Ochsenfeld et al. | 210/677 |
| 4,652,352 | 3/1987 | Saieva | 204/105 R |
| 4,824,575 | 4/1989 | Schlossel | 210/662 |
| 5,066,371 | 11/1991 | DeVoe et al. | 204/149 |
| 5,156,825 | 10/1992 | Sarma et al. | 423/24 |
| 5,269,936 | 12/1993 | Gussmann et al. | 210/675 |
| 5,352,345 | 10/1994 | Byszewski et al. | 204/182.4 |
| 5,407,564 | 4/1995 | Thrailkill | 210/167 |
| 5,718,828 | 2/1998 | Jangbarwala et al. | 521/26 |

FOREIGN PATENT DOCUMENTS

| | | |
|---|---|---|
| 0355966 A1 | 2/1990 | European Pat. Off. . |
| 2732927 B1 | 8/1978 | Germany . |
| 3005249 A1 | 8/1981 | Germany . |
| 54-014366 | 2/1979 | Japan . |

*Primary Examiner*—Ivars Cintins
*Attorney, Agent, or Firm*—Knobbe, Martens, Olson & Bear, LLP

[57] ABSTRACT

Wastewater discharge, which is generated in an ion exchange regeneration system having a cation exchange bed and an anion exchange bed, is minimized by circulating a displacement rinse through a cation exchange bed, saving an effluent of the displacement rinse to be used as a regenerant solution in a subsequent cycle, circulating the remaining rinse in the cation exchange bed through an anion exchange bed that has been exhausted by service flow, circulating a displacement rinse through the anion exchange bed, and circulating a final rinse through the cation and anion exchange beds. The volume of wastewater discharge can be reduced to a degree of approximately 80–90% of a typical conventional system, i.e., waste water discharge can be reduced to 1–2 bed volumes. Storage tanks, automation valves, etc. can be eliminated while high reduction of wastewater discharge is effected.

12 Claims, 3 Drawing Sheets

METHOD FOR MINIMIZING WASTEWATER DISCHARGE

BACKGROUND

1. Field of the Invention

This invention relates to a method for a regeneration system for ion exchange beds used in deionization or demineralization of rinses such as circuit board rinses, aqueous cleaner rinses, plating/anodizing rinses, and tap water deionization systems, and particularly to that allowing for minimizing wastewater discharged from regeneration systems using highly simplified flow.

2. Background of the Art

Ion exchange technology has long been employed for the effective removal of objectionable ions from solutions. Applications include exchange of hardness for sodium (softening), of bicarbonates for chlorides (dealkalizing), and of cations and anions for hydrogen and hydroxyl ions (demineralization).

Ion exchange technology does facilitate a moderate reduction of volume by concentrating the impurities to be removed from water. Regeneration with brine, acid and/or caustic at 5–10% concentrations can produce spent regenerants containing percent levels of the impurity. This is of particular interest when using ion exchange to remove heavy metal contaminants from metal plating rinse streams. Upon regeneration, the contaminant ions, such as copper and nickel, are contained in percent concentrations instead of ppm concentrations and with a corresponding reduction in volume.

However, chemical regeneration increases the total solids of the waste chemicals to ultimately be disposed of. In fact, the total solids can be increased by a factor of three or more unless controls are employed to reduce the waste chemical volume containing the objectionable ions. In addition, the liquid volume of regenerant waste can exceed 15 Bed Volumes (BV) following normal backwash, chemical draw and rinsing steps.

In conventional regeneration of ion exchanges, the bed is first backwashed to loosen dirt and debris and redistribute the resins for better flow without channeling. Backwash flows for cation exchangers are typically 6 gpm per $ft^2$ of bed area. For typical three-foot bed depth recommended by manufacturers, this amounts to 2 $gpm/ft^3$. A backwash conducted for 20 minutes would therefore produce 40 gallons of waste water per cubic foot of resin. For anion exchangers, the flow is less because of the lower density. Nonetheless, approximately 15 gallons of waste are spent per cubic foot of resin. Chemical draw, the next step in regeneration is typically carried out at concentrations of 4–6% or approximately 0.50 lbs (active) per gallon. With regenerant levels of 6–8 $lbs/ft^3$, an average of 15 gallons of waste is produced. The next step is the displacement rinses to propel the regenerant through the beds. These rinse volumes are typically 2–3 BV or 15–20 $gallons/ft^3$. Following the displacement rinse, a rapid rinse is employed at full flow to purge the residual regenerants from the system and prepare the bed for next cycle. This is referred to as the quality rinse and can average 30 minutes for each resin at 2 $gpm/ft^3$. Hence the regeneration waste total for a conventional system typically add up to 18 BV for a cation, and 14.7 BV for an anion (1 Bed Volume is the interior volume of the bed, occupied by the resin and the remaining void in the bed; in this case, 7.5 gals or 1 $ft^3$ of liquid).

Prior attempts to reduce waste volume have employed reuse of regenerants. U.S. Pat. No. 5,352,345 to Byszcwski et al discloses a method in which exhausted regenerating solutions from either a cationic or anionic exchange column are converted into fresh regenerating solutions by using an electrodialytic water splitter, an acid or base purification unit, or any combination thereof However, use of the special device, i.e., the electrodialytic water splitter, the acid or base purification unit, or any combination thereof, is very costly, and the piping system is complicated.

U.S. Pat. No. 4,652,352 to Carl J. Saieva discloses a process for recovering metals from dilute solution utilizing ion exchange in combination with ammonium salt regeneration solutions. However, use of the special device, i.e., the electrolytic recovery system is very costly. Further, the system has serious drawbacks, i.e., simple removal of the metals cannot render the water reusable because the solution contains metal salts such as copper chloride and the other half of the metal salts after removal of the metals will continue to accumulate. In addition, there is no teaching of minimizing rinse.

In addition, Rohm & Haas Amber Hi-Liters No. 120 describes reuse of regenerant. As described, the first third of the regenerant will be overly diluted by the existing water in the resin column and the water in the void volumes between the resin beads. This is sent to waste. The second ⅓, being the most spent, would also be sent to waste. This final ⅓ is suggested for reuse as the first third of the subsequent chemical draw cycles. Thus, the reuse of regenerant is limited to recycling only ⅓ of the entire chemical draw cycle.

SUMMARY OF THE INVENTION

The present invention has exploited a technology to significantly reduce overall waste volume generated in any deionization or demineralization system, regardless of the degree of contamination, including rinsing systems for circuit boards, aqueous cleaning, plating/anodizing, and tap water deionization systems, without the necessity of devices such as an clectrodialyzer for rejuvenation of the spent regenerant. An objective of the present invention is to provide a process of reducing the liquid volume waste of ion exchange regenerants to approximately 1–2 BV per resin, a reduction of over 80–90% from the conventional systems, with highly simplified flow and without using special techniques such as electrodialysis.

Namely, one important aspect of the present invention is a method for minimizing wastewater discharge generated in an ion exchange regeneration system activated after service flow of a service solution is discontinued, said ion exchange regeneration system comprising a cation exchange bed accommodating cation exchange resin and an anion exchange bed accommodating anion exchange resin, said method comprising the steps of: (a) introducing a cation regenerant solution to said cation exchange bed containing the remaining service solution, in a direction opposite to said service flow, to expel the service solution remaining in said cation exchange bed from said cation exchange bed, and saving an effluent from the cation exchange bed (b) continuing introduction of said cation regenerant solution to said cation exchange bed to regenerate said resin, and, separating an effluent, which is expelled from the cation exchange bed, from the regenerant cycle (c) introducing a displacement rinse to said cation exchange bed containing the remaining cation regenerant solution, in a direction opposite to the service flow, to expel the cation exchange solution remaining in said cation exchange bed from said cation exchange bed (d) continuing introduction of said displacement rinse to said cation exchange bed to displace the cation regenerant solution further remaining in said cation exchange bed, with said displacement rinse, and saving an effluent of said displacement rinse to be used as a cation regenerant solution in the subsequent cycle, said effluent having a chemical concentration; (e) increasing the concentration of said effluent to a degree sufficient to be used as a cation regenerant solution; (f) circulating the displacement solution remaining in said cation exchange bed and the service solution remaining in said anion exchange bed in a loop formed by said cation exchange bed and said anion exchange bed in series in the same direction as the service flow, to permit the exhausted anion exchange resin accommodated in said anion exchange bed to adsorb the cation regenerant solution still remaining in said cation exchange bed; (g) introducing an anion regenerant solution to said anion exchange bed after step (f), in a direction opposite to said service flow, to expel the solution remaining in said anion exchange bed from said anion exchange bed and saving an effluent from the anion exchange bed; (h) continuing introduction of said anion regenerant solution to said anion exchange bed to regenerate said resin, and separating an effluent, which is expelled from the anion exchange bed, from the regenerant cycle; (i) introducing a displacement rinse to said anion exchange bed containing the remaining anion regenerant solution, in a direction opposite to the service flow, to expel the anion exchange solution remaining in said anion exchange bed from said anion exchange bed (j) continuing introduction of said displacement rinse to said anion exchange bed to displace the anion regenerant solution further remaining in said anion exchange bed, with said displacement rinse, and saving an effluent of said displacement rinse to be used as an anion regenerant solution in the subsequent cycle, said effluent having a chemical concentration; (k) increasing the concentration of said effluent to a degree sufficient to be used as an anion regenerant solution; and (l) circulating a final rinse in a loop formed by said cation exchange bed and said anion exchange bed in series in the same direction as the service flow, until regeneration is completed. According to the above system, it is possible to reduce the volume of wastewater discharge to a degree of approximately 80–90% of a typical conventional system, i.e., waste water discharge can be reduced to 1–2 bed volumes, by using simply a single portion of cation regenerant, a single portion of anion regenerant, and a single portion of displacement rinse for each of cation and anion regeneration. That is, storage tanks, automation valves, etc. can be eliminated while high reduction of wastewater discharge is effected.

In the above, preferably, the service flow is up-flow in said cation exchange bed and said anion exchange bed, and the cation regenerant solution and said anion regenerant solution are fed into said cation exchange bed and said anion exchange bed, respectively, in a down-flow direction. Further, the volume of the cation regenerant solution used per cation regeneration is normally equal to 1.0–2.0 bed volumes, the volume of the anion regenerant solution used per anion regeneration is normally equal to 1.5–3.0 bed volumes, and the volume of the displacement rinse used per cation or anion regeneration is normally equal to 1.5–3.0 bed volumes, with respect to the volume of said cation exchange bed or said anion exchange bed. However, the volumes of each regenerant can be adjusted depending on the service solution to be treated and the target level of regeneration. In order to save more solution. the saved effluent in steps (b) and (h) are mixed into a service solution. In addition. for the same reason, in step (l), the final rinse is mixed into a service solution after circulating through said cation exchange bed and said anion exchange bed. For simplifying the system, steps (a), (b), (c), (d), (g), (h), (i), and (j) are preferably conducted for predetermined time periods under time control. Further, for the same reason, steps (a), (b), (c), (d), (g), (h), (i), and (j) are preferably conducted under flow control. In the regeneration system, backwash is normally conducted in an up-flow direction, the main function of which is a fluffing of the ion exchange beds.

DETAILED DESCRIPTION OF THE PREFERRED EMBODIMENTS

Figure 1:
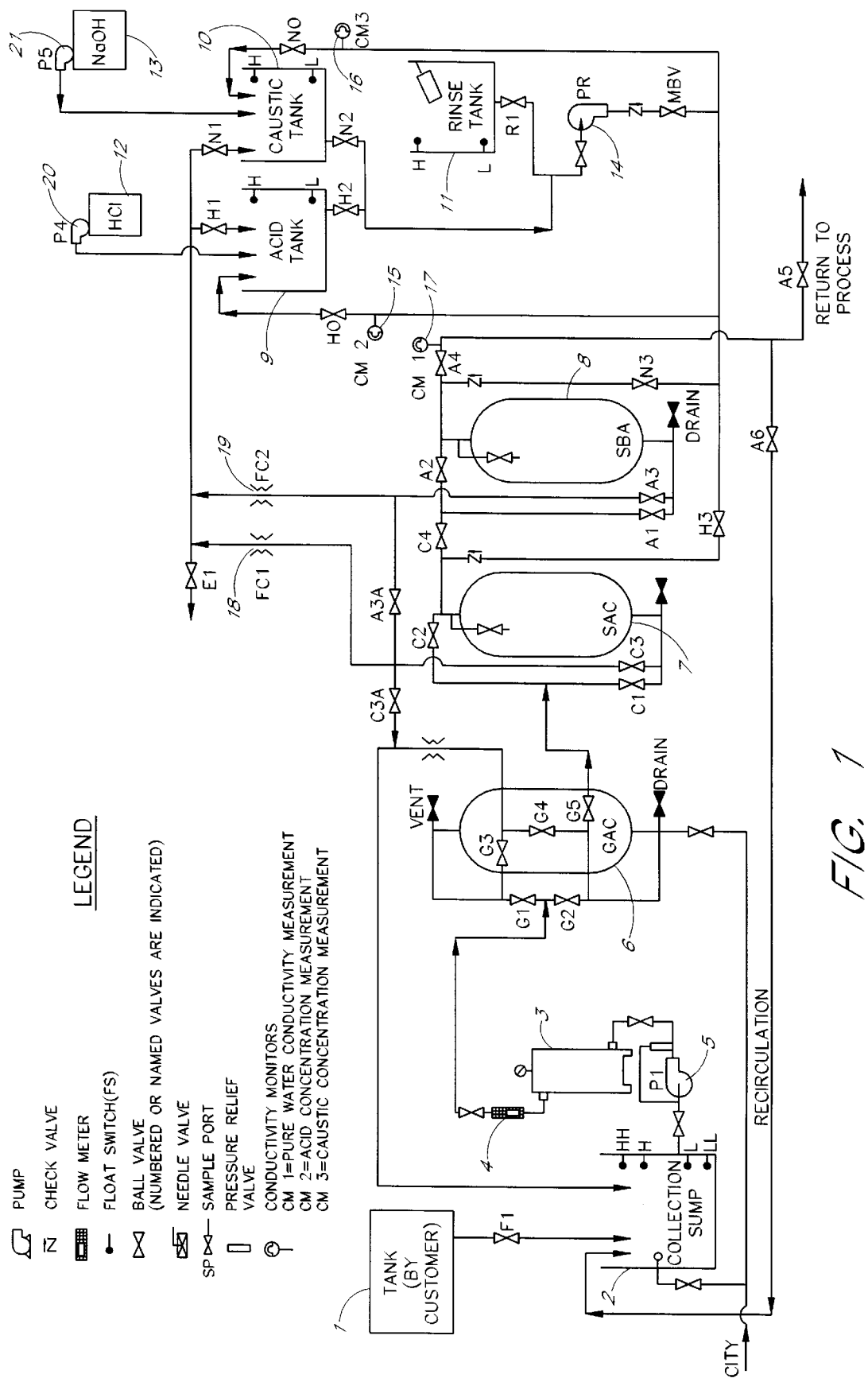
FIG. 1 is a schematic view showing an embodiment of counter-current down-flow regeneration of the present invention (up-flow service), in which a granular activated carbon bed, an acid cation exchange bed, and a base anion exchange bed are placed in series.

There are several ways that reducing waste volume to a certain degree can be conceived. For example, as described above, regenerant solutions can be reduced by partially recycling the chemical draw to the system. However, only ⅓ of the chemical draw can be recycled, if control devices are not used. In addition, counter-current regeneration or regenerant flow opposite to that of service flow results in a lower consumption of chemicals which can mean lower usage (volume). However, a more complex mechanical system is required to compact the bed during the up-flow cycle to improve efficiency. Recycling rinse wastes can reduce overall volume of waste. Usually this is limited to recycling rinse waste only when it is above a certain quality. Minimal backwashes or periodic backwashes can be employed. All of the above conceivable steps combined may reduce waste volumes by 30–40%. Still, the volume of waste liquid to be handled will average 10 BV or 75 gallons per cubic foot of resin. Surprisingly, by employing the internal cycle system and the simply programmed waste system of the present invention, the volume of waste liquid can be easily reduced to 1–2 BV (or 7.5–15 gallons per cubic foot of resin) or less, i.e., approximately ¹⁄₁₀–²⁄₁₀ of the waste volume in the conventional systems.

System

The present invention can be applied to any ion exchange system. Ion exchange systems include deionization or demineralization systems such as rinsing systems for circuit boards, aqueous cleaning, plating/anodizing, and raw water deionization systems, regardless of the degree of contamination. Ion exchange systems also include systems for extracting useful ingredients from process streams in the food processing and pharmaceutical industries, for example. In these applications, an effluent of a regenerant contains useful material, and reduction of the regenerant can eliminate costly concentration procedures such as evaporation, etc. The system to which the present invention can be applied typically comprises a collection sump into which industrial rinse or raw city water flows in a service cycle and into which city water or deionized water flows in a regeneration cycle, a cation exchange column, an anion exchange column, a caustic tanks (anion regenerant solution tank) and an acid tank (cation regenerant solution tank) for chemical draw, a displacement rinse tank for displacement rinse, a feed compartment through which waste is discarded from the system (either an evaporator tank or to a batch type precipitation system), a piping system connecting related equipments, pumps, and flow control systems, and optionally an air purge blower for up-flow regeneration. In the above, the system employs a single tank for displacement rinse. Since the displacement rinse is typically deionize water, and no water is fed back to the tank in a cycle, one tank for displacement is sufficient, which tank is used typically for deionized water-holding storage. Typically, there are four main looped channels: The first channel is for a service cycle and an intermediate cross-over rinse, i.e., process→collection sump→(activated carbon)→cation exchange bed→anion exchange bed→process. In the above, the intermediate cross-over rinse is a rinse circulating through, a cation exchange bed and an exhausted anion exchange bed in sequence after displacement rinse of the cation exchange bed but before regeneration of the exhausted anion exchange bed. In the above, the "exhausted" anion exchange bed (or "unregenerated" anion exchange bed) is simply exhausted with respect to the required quality of water discharged from the system in a service cycle. The term "exhausted" can be defined using the level of leakage of contaminant ions. Thus, even at the point where the leakage is not acceptable for the required quality of water in a service cycle, there is still significant anion absorption capacity remaining in the bed. In conducting the intermediate cross-over rinse, the above remaining capacity is effectively used to adsorb acid remaining in the cation exchange bed upon the displacement rinse for the cation exchange bed. The second channel is for a cation exchange bed regeneration cycle, i.e., cation regenerant solution tank/ displacement rinse tank→cation exchange bed→cation regenerant solution tank. The third channel is for an anion exchange bed regeneration cycle, i.e., anion regenerant solution tank/displacement rinse tank→anion exchange bed→anion regenerant solution tank. The fourth channel is for a quality rinse cycle, i.e., collection sump/collection sump-bypassing line→cation exchange bed→anion exchange bed→collection sump. In down-flow regeneration (counter-current regeneration when service flow is up-flow whereas co-current regeneration when service flow is down-flow), a backwash cycle can be performed in the first channel, regeneration and displacement rinse cycles for the cation exchange bed can be performed in the second channel, regeneration and displacement rinse cycle for the anion exchange bed can be performed in the third channel, an intermediate cross-over rinse cycle can be performed in the first channel, and a final rinse cycle can be performed in the fourth channel. Down-flow regeneration is suitable for the present invention in terms of the degree of simplifying and downsizing the system (e.g., eliminating air purge before regeneration), maintaining high reduction of wastewater discharge. Further, if up-flow regeneration and down-flow regeneration are compared, down-flow regeneration is normally preferred since two liquids having different densities (such as backwash rinse and regenerant) are not merged easily at the boundary, and regenerate can easily flow down by taking advantage of gravity. Up-flow regeneration, however, can be employed. In up-flow regeneration (counter-current regeneration when service flow is down-flow, whereas co-current regeneration when service flow is up-flow), a backwash cycle can be omitted because the regeneration cycle functions also as a backwash cycle.

In the second and third channels, the regenerant and the displacement rinse are circulated, and, in principle, the displacement rinse is saved as the regenerant in the subsequent cycle. After the regeneration of the cation exchange bed but before that of the anion exchange bed, the intermediate cross-over rinse is conducted using the first channel, wherein excess acid present in the cation regenerant can be adsorbed in the exhausted anion exchange resin accommodated in the anion exchange bed. Normally, the intermediate cross-over rinse does not pass through an activated carbon bed, unlike the service flow. The final rinse is conducted based on the same principle as above, but normally, the rinse need not pass through an activated carbon bed as with the intermediate cross-over rinse. As a result, except for part or all of the regenerant, the solutions circulate in the closed loops, i.e., no discharge is generated. According to the above system, by using simply a single cation regenerant tank, a single anion regenerate tank, and a single displacement rinse tank (and typically a collection sump), the system can easily be operated based on time control and flow control.

In DI ion exchange systems, a cation exchange bed is normally placed upstream of an anion exchange bed. The reason is that the anion resin converts all anions to the hydroxide species and the hydroxide species of most divalent metals (including calcium, copper, tin, lead, etc.) are insoluble. Therefore, if these were introduced to an anion bed, they would precipitate and foul the resin. In some systems, the anion can be used first, for example, if sodium form cation resin is used first to soften the incoming industrial rinse so as to remove the divalent metal therefrom.

In order to constitute a more time-efficient system, the use of a pair of ion exchange columns is advantageous, i.e., placing two beds in parallel. In that system, one ion exchange column, which is exhausted, is subjected to regeneration while the other is in service, so that industrial rinse can be continuously treated by switching columns.

In addition, a chelated metal removal column, an adsorbent column such as a granular activated carbon column and various types of polymeric adsorbents (Rohm & Haas XAD series adsorbents), and a filtration device can be installed upstream of the cation column in this order in order to further minimize the waste volume more efficiently.

As the ion exchange resin, uniform bead size resin is preferably employed in order to more efficiently minimize rinse water volume requirements. Resin beads are normally sized as −16+50 mesh. Uniform beads have uniform regeneration characteristics and thus reduce waste volume, particularly rinses. Beads can be specified by size and uniformly sized beads are available. These resins are typically sized in the −30+45 mesh range. The more uniform the bead, the less rinse and regenerant contact time needed. Therefore, by using a more uniform bead, waste volume can be reduced more. For example, Purolite PFC-100 and PFA-400 can be preferably used. In the initial part of the regenerant introduction, there is some lifting of the bed for loosening and cleaning. However, as regeneration proceeds, the resins expand and the bed becomes "packed". There is only enough room for the resin to fluff up.

Further, one of or any combination of a metal-selective resin column preceding the cation column, a mixed bed type polisher column after the anion column, a weak base anion column preceding the anion column, and a weak acid cation column following the anion column can be installed, depending on the quality of industrial rinses and the target treatment.

The end of the system is an evaporator tank or a batch type precipitation system into which the final waste flows. The final waste is concentrated, and subjected to further treatment if necessary. In the present invention, the waste volume is very small, and thus only a very low-volume evaporator tank is required, and concentration is very efficient. Typically, a non-heated atmospheric evaporator can be used.

Service Cycle

The industrial rinses to be treated arc not particularly limited. For example, circuit board rinses and aqueous cleaner rinses having traces of heavy metals polishers used in metal hydroxide precipitation systems, and raw water to be deionized can be treated.

Flow rate is generally 4 to 10 gpm per $ft^2$ of bed area and 1 to 2 gpm per $ft^3$ of bed volume, although the rate can widely vary depending on the size, the intended use, and the target level of treatment of the system. The system usually runs up-flow during service in this system which is the normal flow direction. However, down-flow can be employed depending on the target industrial rinses, the overall treatments, and other factors.

Pre-filtration in the service cycle reduces but does not eliminate the need for backwashing in a regeneration cycle. That is, pre-filtration is done to reduce the particulate load going to the resin beds which in turn, reduces the needs for backwashing. For pre-filtration, granular activated carbon is suitable. However, a particulate filter such as multi-media or cartridges can also be used. The granular activated carbon also serves to reduce the organic load which is problematic for the anion resin. If pre-filtration is conducted, backwashing is modified to accomplish reclassification only, thereby eventually reducing the waste volume.

Regeneration Cycle

After discontinuing the service cycle in the system (if two pairs of cation and anion exchange beds are installed in parallel, one pair of exhausted beds is subjected to regeneration cycle while the other pair of beds is put into service in turn), a regeneration cycle starts. There are two functional approaches to regeneration of deionization systems, one being referred to as counter-current regeneration in which the direction of service flow and that of regeneration flow are opposite, the other being referred to as co-current regeneration in which the direction of service flow and that of regeneration flow are the same. There are also two operational approaches to regeneration of deionization systems, one being referred to as up-flow regeneration in which regeneration is conducted in an up-flow direction, the other being referred to as down-flow regeneration in which regeneration is conducted in a down-flow direction. The up-flow and down-flow regeneration methods can be applied to both up-flow and down-flow service systems, i.e., irrespective of the direction of the service flow. However, counter-current regeneration is normally more efficient than co-current regeneration because the integral of the ion exchange rate from the inlet to the outlet is normally greater in counter-current regeneration than in co-current regeneration. If up-flow regeneration and down-flow regeneration are compared, down-flow regeneration is normally preferred since two liquids having different densities (such as backwash rinse and regenerant) are not merged easily at the boundary, and regenerant can easily flow down by taking advantage of gravity. Thus, the descending order of significance may be: 1) up-flow service cycle and down-flow regeneration (counter-current down-flow regeneration), 2) down-flow service cycle and up-flow regeneration (counter-current up-flow regeneration), 3) down-flow service cycle and down-flow regeneration (co-current down-flow regeneration), and 4) up-flow service cycle and up-flow regeneration (co-current up-flow regeneration). However, in consideration of the fact that down-flow service cycle is much more common than up-flow service, the above 2) may be more important in industry, Although the relative direction of regeneration, counter-current or co-current, is more important than the absolute direction of regeneration, up-flow or down-flow, the operation of regeneration of the present invention will be explained based on the absolute direction, since the operations of counter-current up-flow regeneration and co-current up-flow regeneration are substantially the same, and the operations of counter-current down-flow regeneration and co-current down-flow regeneration are substantially the same.

Regeneration processes typically comprise backwash, chemical draw, displacement rinse, and final rinse. Each process can be independently controlled. However, matching the direction of each flow is beneficial. In a typical embodiment, backwash is up-flow, chemical draw and displacement rinse are either down-flow, intermediate crossover rinse is up-flow, and final rinse is up-flow. The final rinse is usually employed at full flow to purge the residual regenerates from the system and prepare the beds for the next cycle, and thus the final rinse is conducted in a different channel. Although any combination in terms of the direction of each flow can be employed, one typical embodiments, i.e., down-flow regeneration, will be explained below.

Down-flow Regeneration

In down-flow regeneration, chemical draw and displacement rinse are performed in an ion exchange bed in a down-flow direction. Backwash can be separately conducted in an up-flow direction using a different channel, and recycled in a loop. This backwash can be conducted based on conventional backwash, i.e., the flow rate is typically 6 gpm per $ft^3$ for cation exchange beds, 2 $gpm/ft^3$ for anion exchange beds. After backwash, the remaining water in the beds is expelled by the first effluent from the chemical draw cycle and brought back to a collection sump.

Chemical draw and displacement rinse can be performed in a similar way to that in up-flow regeneration. Regenerant and displacement rinse are introduced to a bed from an upper part of the bed, e.g., just above the resin accommodated in the bed, because there is a large free space above the resin in the bed, which is filled with untreated water. Regenerant introduced just above the resin can automatically move downward. In brief, similar to up-flow regeneration, down-flow regeneration can be conducted as follows:

(a) backwashing cation and anion exchange beds by circulating backwash rinse through said cation and anion exchange beds in an up-flow direction, and recirculating said backwash rinse;

(b) preparing a cation regenerant having a 1–2 VB;

(c) until lag time elapses (i.e., time required for the regenerate to reach the cation exchange bed from the regenerant tank) or until a predetermined volume of the regenerant flows, introducing the cation regenerant solution to the cation exchange bed containing the remaining service solution, in a direction opposite to the service flow, to expel the service solution remaining in the cation exchange bed from the cation exchange bed to the collection sump;

(d) continuing introduction of the cation regenerant solution to the cation exchange bed to regenerate the resin, and saving an effluent from the cation exchange bed;

(e) preparing a displacement rinse having preferably 1.5–3.0 BV;

(f) until lag time elapses (i.e., time required for the displacement rinse to reach the cation exchange bed from the regenerant tank) or until a predetermined volume of the displacement rinse flows, introducing the displacement rinse to the cation exchange bed containing the remaining cation regenerant solution, in a direction opposite to the service flow, to expel the cation exchange solution remaining in the cation exchange bed from the cation exchange bed and further from the regenerant cycle;

(g) continuing introduction of the displacement rinse to the cation exchange bed to displace the cation regenerant solution further remaining in the cation exchange bed, with the displacement rinse, and saving an effluent of the displacement rinse to be used as a cation regenerant solution in the subsequent cycle, said effluent having a chemical concentration;

(h) increasing the concentration of said effluent to a degree sufficient to be used as a cation regenerate solution;

(i) circulating the displacement solution remaining in the cation exchange bed and the service solution remaining in the anion exchange bed in a loop formed by the cation exchange bed, the anion exchange bed, and the collection sump in series in the same direction as the service flow, to permit the exhausted anion exchange resin accommodated in the anion exchange bed to adsorb the cation regenerant solution still remaining in the cation exchange bed;

(j) preparing an anion regenerant solution having preferably 1.5–3.0 BV;

(k) until lag time elapses (i.e., time required for the regenerant to reach the anion exchange bed from the regenerant tank) or until a predetermined volume of the regenerant flows, introducing the anion regenerant solution to said anion exchange bed after step (i), in a direction opposite to the service flow, to expel the solution remaining in the anion exchange bed from the anion exchange bed;

(l) continuing introduction of the anion regenerant solution to the anion exchange bed to regenerate the resin, and saving an effluent from said anion exchange bed;

(m) preparing a displacement rinse having preferably 1.5–3.0 BV;

(n) until lag time elapses (i.e., time required for the displacement rinse to reach the anion exchange bed from the regenerant tank) or until a predetermined volume of the displacement rinse flows, introducing the displacement rinse to the anion exchange bed containing the remaining anion regenerant solution, in a direction opposite to the service flow, to expel the anion exchange solution remaining in the anion exchange bed from the anion exchange bed and further from the regenerant cycle:

(o) continuing introduction of the displacement rinse to the anion exchange bed to displace the anion regenerant solution further remaining in said anion exchange bed, with the displacement rinse, and saving an effluent of the displacement rinse to be used as an anion regenerant solution in the subsequent cycle, the effluent having a chemical concentration;

(p) increasing the concentration of the effluent to a degree sufficient to be used as an anion regenerant solution; and (q) circulating a final rinse in a loop formed by the cation exchange bed and the anion exchange bed in series in the same direction as the service flow, until regeneration is completed.

In the above, preferably, volume control is performed in steps (d), (g), (l), and (o), for example, by level switches installed in the respective tanks. Chemical draw is typically carried out at concentrations of 4–6% or approximately 0.50 lbs (active) per gallon in the conventional processes. In the present invention, concentration of regenerants is increased, for example, to 6–8%. This concentration is kept at precise levels with the help of concentration monitors and a chemical injection pump which adds the proper regenerant chemicals. The concentration of chemical in each column, therefore is consistent for proper regeneration. Typical ion exchange system utilize regenerant chemicals at 4–5%. An increased concentration helps minimize waste water volume. Although approximately 6% typifies the concentration in the present invention, properly controlled, regenerant concentrations can be pushed all the way up to 15 to 20%. However, the higher the concentration, the lower the volume of regenerant. There are certain minimum contact times needed for adequate regeneration. If the volume is too small, even at a higher concentration, the contact time is too short and poor regeneration results. Systems that use very high concentrations also use very high volumes and produce a lot of water. Normal practical limits may be a low of 2% and a high of 12.5%. For example, as the chemicals for chemical draw, HCl, $H_2SO_4$, NaOH, and NaCl can be used. Regeneration is typically carried out at flow rates of 0.25 to 1.0 gpm per $ft^3$.

Interrupted flow (pulse flow) is also advantageous in the displacement cycle as it is advantageous in backwash and chemical draw, especially when up-flow regeneration is employed.

Final Rinse

In both, up-flow regeneration and down-flow regeneration, after the above-described displacement rinse, the ion exchange beds are subjected to final rinse or quality rinse to purge the residual regenerants from the system and prepare the bed for the next cycle. This is also referred to as rapid rinse and can average 10–30 minutes for each resin at 2–3 gpm/$ft^3$. Final rinse can be performed in cation and anion exchange beds in series as follows:

(A) circulating the final rinse through the cation exchange bed and the anion exchange bed in series in a downflow direction; and (B) recirculating said final rinse until the quality of rinse discharged from either cation or anion exchange bed reaches a predetermined level. Part of the channel for the service cycle can be assigned to the final rinse. This rinse is an internal rinse, all of which is recirculated.

Excess chemicals left after displacement are rinsed out and picked up by the opposition resin, resulting in using up the capacity of the resin. However, the benefit of minimized water volume outweighs the above minor drawbacks. That is, there is some loss of capacity, particularly the capacity of the anion exchange bed, due to the fact that the rinse waters are recirculated. As with the intermediate cross-over rinse, excess acid in the cation exchange bed is adsorbed by the anion exchange bed. If the capacity of the resin is roughly equal to 2 lbs of regenerant, and there is less than 1% regenerant left in the final rinse, then 2–3% of the total capacity will be lost while reducing the rinse volume by 30–40 gallons (4–6 BV). This is not a significant loss as compared with the great benefit of reduction of the total waste volume. Dcionized water readily picks up caustic acid and efficiently neutralizes rinse discharged from ion exchange beds. When the conductivity of the rinse is below a predetermined level, regeneration is complete, and the service cycle is resumed.

Other Processes

A metal-selective resin column, a mixed-bed type polisher column, a weak base anion column, a weak acid cation column, and others can be used in a system, depending on what is in the stream, what should be taken out, and what quality is required at the end. If the system contains chelated copper, nickel or zinc, it is generally necessary to use a selective resin to break this chelate. Other forms of complex metals do not require it. If the metal-selective resins are used to do some of the "roughing", the deionized system may not have to work as hard. A granular activated carbon bed is normally equipped for removal of organics.

If ultra-high purity water is needed, a mixed-bed is generally used. Mixed-beds are preferably avoided because they are difficult to regenerate and use a lot of water. Instead, a weak acid cation polisher can be used to pick up any cations that leak through.

Weak acid cation polishers can be used to remove traces of sodium that may leak from conventional cation systems. Sodium can be "bumped" off the cation by heavy metals which are more selectively held. In this case the polisher picks up mainly sodium. However, if the cation loading is excessive, the polisher may simply serve as reserve capacity.

Weak base resins may be used with cation only or in front of strong base anion columns.

EMBODIMENT 1
Counter-Current Down-Flow Regeneration System

FIG. 1 is a schematic piping system showing an example of a basic deionizing and regenerating system adapted to the present invention, in which counter-current down-flow regeneration is adopted.

Service flow is performed in an up-flow direction via a collection sump 2, a pump 5, a filter 3, a flow meter 4, a valve GI, a granular activated carbon bed 6, valves G5 and C1, a cation exchange bed (strong acid) 7, valves C4 and A1, an anion exchange bed (strong base) 8, valves A4 and A5, and a service outlet.

Backwash for the cation and anion exchange beds 7 and 8 is performed in an up-flow direction in a loop via the pump 5, the filter 3, the flow meter 4, the valve G1, the granular activated carbon bed 6, the valves G5 and C1, the cation exchange bed 7, the valves C4 and A1, the anion exchange bed 8, the valves A4 and A6, and the collection sump 2, whereby divalent cation is removed prior to entering the anion exchange bed.

Process Description

In this embodiment, during regeneration, the cycles are not based on level switches but on time, as well as on volume controlled by a flow controller (FC). Also, this system regenerates sequentially, i.e., the cation first, and anion second.

Parameters

1. An acid tank 9 holds 1.5 bed volumes of 1.0 lb/gallon HCl. A flow controller 18 controls the flow such that the flow is 0.33 gpm per cubic foot of resin.

2. A caustic tank 10 holds 2.0 bed volumes of 0.70 lb/gal of NaOH. A flow controller 19 controls the flow such that it is 0.33 gpm per cubic foot of resin.

3. A rinse tank 11 holds 2 bed volumes of tap water for rinsing. A float valve (not indicated) connected to the city water supply automatically keeps this tank filled to a pre-determined level.

In the above, individual flow controllers are used because sometimes the volumes of resins in the two columns are not equal, based on the customer's waste water contamination level.

Regeneration steps

1. A pump 14 is activated, and valves H2, H3, and C3 open for 30 minutes. For the first 6 minutes, the solution is diverted to the collection sump 2 via valve C3-A.

2. After the first 6 minutes, valve C3-A closes and the waste is directed to a waste tank (to be provided by a client) via valve E-1.

3. After 30 minutes, H2 closes, and R1 opens, thereby starting the rinse cycle.

4. After valve E-1 has been open for thirty minutes, valve E-1 closes and valve H1 opens, the rinse water (dilute acid) is sent to the acid tank 9 for thirty minutes.

5. After the acid tank 9 is full, valves H1, H3, and C3 close, and valve H0 opens, thereby starting recirculation of the water using the pump 14 through a concentration monitor 15. At the same time, a pump 20 is activated and pumps acid from a tank 12 into the acid tank 9, and the concentration monitor 15 sends a signal that the appropriate concentration is reached.

6. At the same time as step 5, a pump 5 is activated, valves G1 and G5 open, water from the collection sump 2 is run through the cation exchange bed 7 via valve C1 and through the anion exchange bed via valves C4, A1, and A4, and back to the collection sump 2 via valve A6 at the service flow rate for 10 minutes to allow for excess acid to be adsorbed by the exhausted anion resin.

7. After steps 5 and 6, valve N2 opens for 45 minutes, valve N3 opens, and a caustic solution is pumped into the anion exchange bed 8. As with cation regeneration, for the first 6 minutes, the effluent is sent to the collection sump 2 via valve A3A.

8. After the first 6 minutes, valve A3A closes, and valve E-1 is opened for 45 minutes, thereby sending water to a waste tank as in 2 above.

9. After valve N2 has been open for 45 minutes, it is closed, and valve R1 is opened, thereby starting the rinse cycle.

10. After valve E-1 has been open for 45 minutes, valve E-1 is closed, and water is diverted to the caustic solution tank 10 via valve N1 for 45 minutes.

11. After the caustic solution tank 10 is full, valve N0 opens and water is recirculated using the pump 14 through a concentration monitor 16 with a pump 21 pumping an alkali from a tank 13 into the caustic tank 10 to bring the concentration of the caustic to the desired level. When the concentration monitor 16 sends signal that this concentration is reached, the pump 21 is off, valve N0 closes, and the pump 14 goes off.

12. Final rinse is achieved by operating service valving, and bypassing a GAC (granule activated carbon) 6. The pump 5 is activated, and valves G2, G5, C1, C4, A1, A4, A6 open and the system recirculates until a monitor 17 achieves the desired conductivity.

In the above, for example, 5 ft$^3$ of "PFC-100-H" (product name, Purolite Co., Philadelphia) can be used as the strong acid cation resin. 5 ft$^3$ of PFA-400-OH (product name, Purolite Co., Philadelphia) can be used as the strong base anion resin. 6 ft 3 of 8×3 coal based acid washed (ATOCIIEM, Oklahoma) can be used as the granular activated carbon. Ametek™ 4"×20"-spun bonded polypropylene (AMFTEK, Connecticut) can be used as the filter. Rinse to be deionized may have a conductivity of 1,700 $\mu S \cdot cm^-$. After 10 hours service cycle, the conductivity of deionized water discharged from the strong base anion exchange bed 8 may become as high as 10 $\mu S \cdot cm^-$ measured by the conductivity monitor 17, meaning that the beds 7 and 8 have been exhausted. In the acid tank 9, 8% HCl solution may be accommodated. In the caustic tank 10, 6% NaOH solution may be accommodated. Upon the final rinse the conductivity measured by the conductivity monitor 17 may be changed from 1,000 $\mu$S·cm$^-$ at the beginning to 2 $\mu$S·cm$^-$. This level shows that the beds are regenerated.

The present invention allows for benefit from volume reduction in the regenerant waste. The reduction can be 86% or higher. The cost and space required for this system are small. Thus, wastewater reduction per required cost and space is very high. When the size of the system is not large, the savings from eliminating the storage tanks, automation, valves, etc., compared to having to evaporate slightly more water are very advantageous.

EMBODIMENT 2
Counter-Current Down-Flow Regeneration Dual-Line System

Figures 2, 2A, 2B:
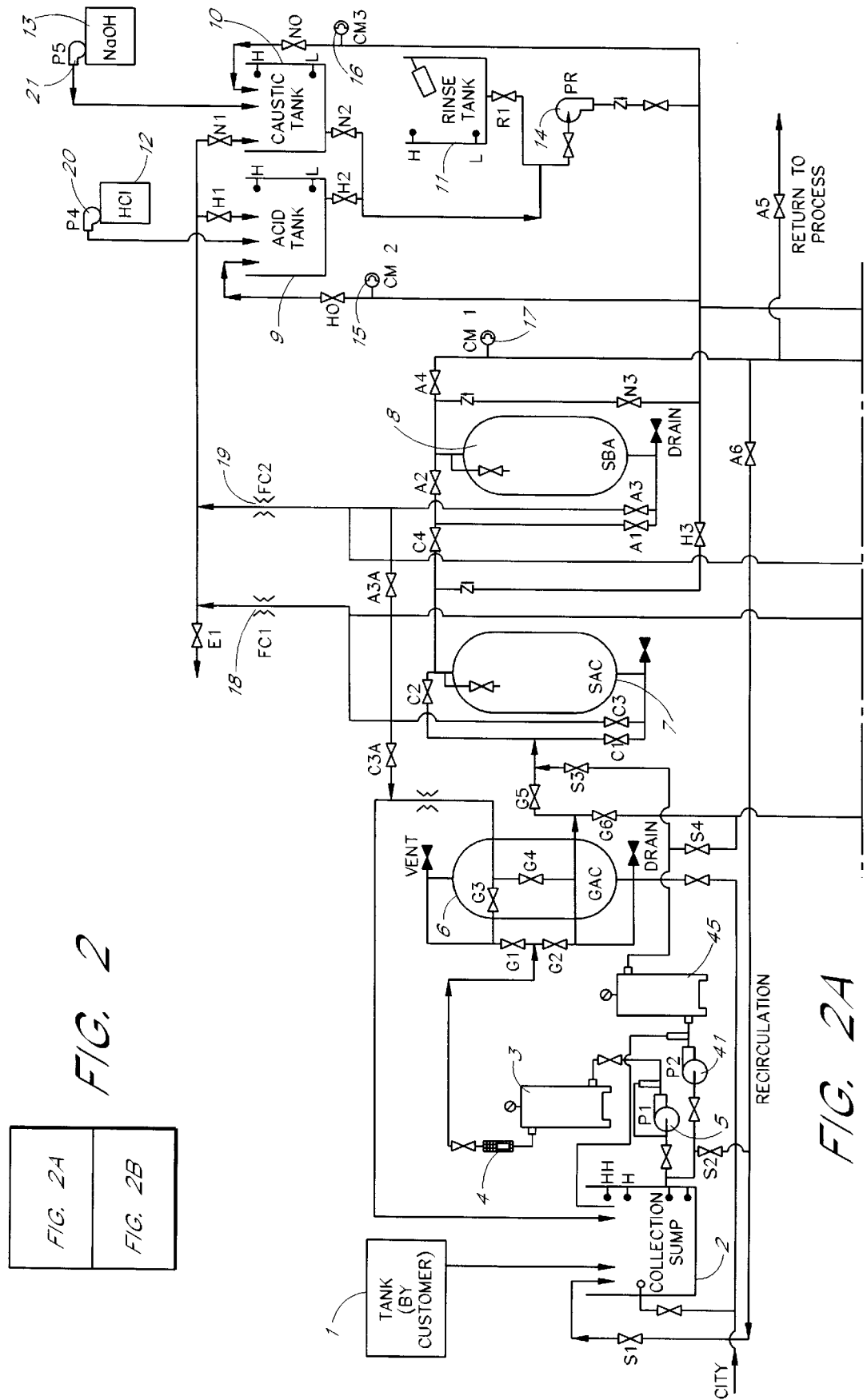
FIG. 2 is a schematic view showing an embodiment of counter-current down-flow regeneration of the present invention (Lip-flow service), in which a granular activated carbon bed, a pair of acid cation exchange beds, and a pair of base anion exchange beds are placed in sequence, wherein each one of the paired beds is in service and the other one is in regeneration process.
Figure 2B:
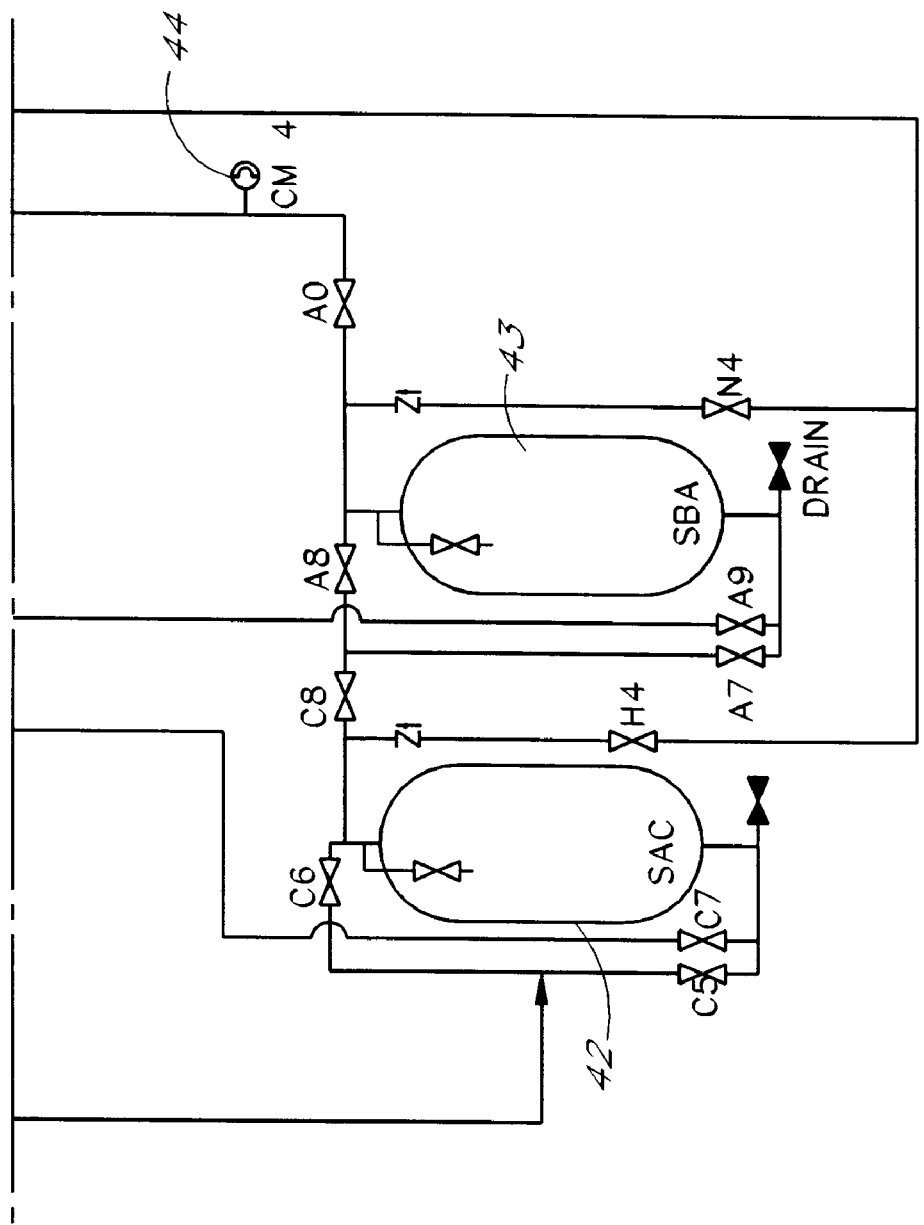

FIG. 2 is a schematic piping system showing an example of a deionizing and regenerating system adapted to the present invention, in which counter-current down-flow regeneration is adopted. A regeneration cycle is basically the same as that of Embodiment 1 described above (FIG. 1), and thus detailed explanation will be omitted. In this embodiment, a twin alternating system can be designed. In the final rinse, if the top train is being regenerated, a pump 41 is activated, valve S3 is opened, valves C1, C4, A1, A4, A6, and S2 are opened until a monitor 15 achieves the desired conductivity. In the figure, while the upper train (the cation exchange bed 7 and the anion exchange bed 8) is in regeneration, the lower train (a cation exchange bed 42 (strong acid), and an anion exchange bed 43 (strong base)) can be in service using a channel formed by the collection sump 2, the pump 5, the filter 3, the flow meter 4, valve G1, the granule activated carbon 6, valves G6 and C5, the cation exchange bed 42, valves C8 and A7, the anion exchange bed 43, valves A0 and A5, and a service outlet. When the cation exchange bed 42 and the anion exchange bed 43 are exhausted, regeneration starts, whereas the upper train is subjected to a service cycle. The regeneration treatment of the lower train is conducted in the same way as the upper train, i.e., the cation regenerant circulates through valve H4, the cation exchange bed 42, valve C7, the flow controlor 18, valve E-1, and a discharge outlet. The first effluent from the cation exchange bed 42 is sent to the collection sump 2 via valves C7 and C3-A. The anion regenerant circulates through valve N4, the anion exchange bed 43, valve A9, the flow controller 19, valve E-1, and the discharge outlet. The first effluent from the anion exchange bed 43 is sent to the collection sump 2 via valves A9, A3-A, and C3-A. Displacement rinse for the cation exchange bed 42 is conducted in a loop formed by valve H4, the cation exchange bed 42, valve C7, the flow controller 18, valve H1. Displacement rinse for the anion exchange bed 43 is conducted in a loop formed by valve N4, the anion exchange bed 43, valve A9, the flow controller 19, and valve N1. Cross-over rinse is conducted in a loop formed by the cation exchange bed 42, valves C8 and A7, and the anion exchange bed 43, valves A0, A6, and S2, the pump 41, the filter 45, valve C5, and the cation exchange bed 42. This loop can be used for final rinse. In the final rinse cycle, a conductivity monitor 44 is used to monitor the conductivity of the solution. In the above, in the cross-over rinse cycle and the final rinse cycle, the collection sump 2 is bypassed, but the solution can pass through the collection sump 2.

It will be understood by those of skill in the art that numerous variations and modifications can be made without departing from the spirit of the present invention. Therefore, it should be clearly understood that the forms of the present invention are illustrative only and are not intended to limit the scope of the present invention.

We claim:

1. A method for minimizing wastewater discharge generated in an ion exchange regeneration system activated after service flow of a service solution is discontinued, said ion exchange regeneration system comprising a cation exchange bed packed with cation exchange resin and an anion exchange bed packed with anion exchange resin, said method comprising the steps of:

(a) introducing a cation regenerant solution to said cation exchange bed containing a remaining service solution, in a direction opposite to said service flow, to expel the service solution remaining in said cation exchange bed from said cation exchange bed, and saving the expelled effluent from said cation exchange bed;

(b) continuing introduction of said cation regenerant solution to said cation exchange bed to regenerate said resin, and separating an effluent, which is expelled from said cation exchange bed, from the ion exchange regeneration system;

(c) introducing a displacement rinse to said cation exchange bed containing a remaining cation regenerant solution, in a direction opposite to the service flow, to expel the cation exchange solution remaining in said cation exchange bed from said cation exchange bed;

(d) continuing introduction of said displacement rinse to said cation exchange bed to displace the cation regenerant solution further remaining in said cation exchange bed, with said displacement rinse, and saving an effluent of said displacement rinse to be used as a cation regenerant solution in the subsequent cycle, said effluent having a chemical concentration;

(e) increasing the concentration of said effluent to be used as a cation regenerant solution;

(f) circulating the displacement solution remaining in said cation exchange bed and the service solution remaining in said anion exchange bed in a loop formed by said cation exchange bed and said anion exchange bed in series in the same direction as the service flow, to permit the exhausted anion exchange resin packed in said anion exchange bed to adsorb the cation regenerant solution still remaining in said cation exchange bed;

(g) introducing an anion regenerant solution to said anion exchange bed after step (f), in a direction opposite to said service flow, to expel the solution remaining in said anion exchange bed from said anion exchange bed, and saving an effluent from said anion exchange bed;

(h) continuing introduction of said anion regenerant solution to said anion exchange bed to regenerate said resin, and separating an effluent, which is expelled from said anion exchange bed, from the ion exchange regeneration system;

(i) introducing a displacement rinse to said anion exchange bed containing a remaining anion regenerant solution, in a direction opposite to the service flow, to expel the anion exchange solution remaining in said anion exchange bed from said anion exchange bed;

(j) continuing introduction of said displacement rinse to said anion exchange bed to displace the anion regenerant solution further remaining in said anion exchange bed, with said displacement rinse, and saving an effluent of said displacement rinse to be used as an anion regenerant solution in the subsequent cycle, said effluent having a chemical concentration;

(k) increasing the concentration of said effluent to be used as an anion regenerant solution; and (l) circulating a final rinse in a loop formed by said cation exchange bed and said anion exchange bed in series in the same direction as the service flow, until regeneration is completed.

2. A method for minimizing wastewater discharge according to claim 1, wherein the service flow is up-flow in said cation exchange bed and said anion exchange bed, and the cation regenerant solution and said anion regenerant solution are fed into said cation exchange bed and said anion exchange bed, respectively, in a down-flow direction.

3. A method for minimizing wastewater discharge according to claim 1, wherein said ion exchange regeneration system further comprises a service solution collection sump, and in step (f), the circulating solution passes through said collection sump.

4. A method for minimizing wastewater discharge according to claim 1, wherein the volume of the cation regenerant solution used per cation regeneration is equal to 1.0–2.0 bed volumes, the volume of the anion regenerant solution used per anion regeneration is equal to 1.5–3.0 bed volumes, and the volume of the displacement rinse used per cation or anion regeneration is equal to 1.5–3.0 bed volumes, with respect to the volume of said cation exchange bed or said anion exchange bed.

5. A method for minimizing wastewater discharge according to claim 1, wherein the saved effluent in steps (a) and (g) are mixed into a service solution.

6. A method for minimizing wastewater discharge according to claim 1, wherein said ion exchange regeneration system further comprises a service solution collection sump, and in step (f), the circulating solution bypasses said collection sump.

7. A method for minimizing wastewater discharge according to claim 1, wherein said ion exchange regeneration system further comprises a service solution collection sump, and in step (l), the circulating final rinse passes through said collection sump.

8. A method for minimizing wastewater discharge according to claim 1, wherein said ion exchange regeneration system further comprises a service solution collection sump, and in step (l), the circulating final rinse bypasses said collection sump.

9. A method for minimizing wastewater discharge according to claim 1, wherein steps (a), (b), (c), (d), (g), (h), (i), and (j) are conducted for predetermined time periods.

10. A method for minimizing wastewater discharge according to claim 1, wherein a flow controller is provided downstream of each of said cation exchange bed and said anion exchange bed, and completion of each of steps (a), (b), (c), (d), (g), (h), (i), and (j) is determined by predetermined volumes of liquid detected by the flow controllers.

11. A method for minimizing wastewater discharge according to claim 1, further comprising, prior to step (a), backwashing said cation exchange bed and said anion exchange bed in a up-flow direction.

12. A method for minimizing wastewater discharge according to claim 1, wherein said cation regenerant solution is stored in a tank, and said anion regenerant solution is stored in a tank, each tank being equipped with level switches, wherein completion of each of steps (a) through (d) and (g) through (j) is determined by predetermined signals from the level switches.

* * * * *